(12) United States Patent
Lin et al.

(10) Patent No.: US 6,964,531 B2
(45) Date of Patent: Nov. 15, 2005

(54) LIGHT MODULE AND KEYBOARD UTILIZING SAME

(75) Inventors: Chih-Nan Lin, Yunlin (TW); Huang-Chang Hsu, Taoyuan (TW); Chien-Shih Hsu, Taipei (TW)

(73) Assignee: Darfon Electronics Corp., Taoyuan (TW)

( * ) Notice: Subject to any disclaimer, the term of this patent is extended or adjusted under 35 U.S.C. 154(b) by 0 days.

(21) Appl. No.: 10/863,737

(22) Filed: Jun. 8, 2004

(65) Prior Publication Data

US 2004/0258449 A1  Dec. 23, 2004

(30) Foreign Application Priority Data

Jun. 17, 2003  (TW) ................ 92116343 A

(51) Int. Cl.[7] .............. B41J 5/08; H01R 33/00
(52) U.S. Cl. .......... 400/472; 400/487; 362/249; 362/226
(58) Field of Search ............... 400/472, 487, 400/494, 578; 324/403, 406; 315/291, 185 R, 315/185 S; 340/815.45; 362/249, 227, 267, 362/800, 252, 226; 345/76, 82

(56) References Cited

U.S. PATENT DOCUMENTS

| | | | | |
|---|---|---|---|---|
| 5,347,110 A | * | 9/1994 | Audebert et al. ............ 235/380 |
| 5,424,731 A | * | 6/1995 | Kronberg ..................... 341/26 |
| 5,629,587 A | * | 5/1997 | Gray et al. ................. 315/292 |
| 5,936,599 A | * | 8/1999 | Reymond .................... 345/82 |
| 6,031,343 A | * | 2/2000 | Recknagel et al. ......... 315/292 |
| 6,320,322 B1 | * | 11/2001 | Tanaka .................... 315/169.3 |
| 6,350,996 B1 | * | 2/2002 | Kawai et al. ................ 257/88 |
| 6,373,454 B1 | * | 4/2002 | Knapp et al. ................ 345/76 |
| 6,461,019 B1 | * | 10/2002 | Allen ........................ 362/249 |
| 6,578,986 B2 | * | 6/2003 | Swaris et al. ............... 362/249 |
| 6,830,358 B2 | * | 12/2004 | Allen ........................ 362/640 |
| 6,846,093 B2 | * | 1/2005 | Swaris et al. ............... 362/249 |
| 6,853,150 B2 | * | 2/2005 | Clauberg et al. ........ 315/185 R |
| 6,891,520 B2 | * | 5/2005 | Chen et al. ................... 345/82 |
| 2002/0043943 A1 | * | 4/2002 | Menzer et al. ............. 315/291 |
| 2002/0071705 A1 | * | 6/2002 | Zilberman et al. .......... 400/472 |
| 2002/0122683 A1 | * | 9/2002 | Kamei et al. ............... 400/472 |
| 2004/0252501 A1 | * | 12/2004 | Moriyama et al. .......... 362/238 |

\* cited by examiner

*Primary Examiner*—Minh Chau
*Assistant Examiner*—Wasseem H. Hamdan
(74) *Attorney, Agent, or Firm*—Quintero Law Office

(57) ABSTRACT

A light module having a first power line, a second power line, and light devices. The first power line is connected to a first power point. The second power line is connected to a second power point. Each light device having a first terminal coupled to the first power line and a second terminal coupled to the second power line. A first sum of a first line length between the first power point and the first terminal of any of the light devices and a second line length between the second power point and the second terminal thereof is substantially a first constant.

9 Claims, 6 Drawing Sheets

LIGHT MODULE AND KEYBOARD UTILIZING SAME

BACKGROUND

The invention relates to a light module and, in particular to a light module with enhanced lighting capability.

Since computers may be used in various environments, with different lighting, a light keyboard has been provided.

Conventionally, a light keyboard comprises light emitting diodes disposed under each key thereof. FIG. 1 is a circuit view of light emitting diodes of a conventional light keyboard. Each current path comprises one light emitting diode and several resistors. For example, current path $I_1$ comprises light emitting diode $LED_1$ and resistors $R_1$, $R_{11}$ and $R_{21}$ from power line $V_{CC}$ to grounded line Gnd, and current path $I_2$ comprises light emitting diode $LED_6$ and resistors $R_1 \sim R_6$, $R_{16}$ and $R_{21} \sim R_{26}$ from power line $V_{CC}$ to grounded line Gnd.

Since the number of resistors on current path $I_1$ and current path $I_2$ are different, the currents are also different. Light emitting diodes $LED_1$ and $LED_6$ generate different level of lighting such that lighting of the light keyboard is non-uniform.

SUMMARY

Accordingly, an object of the present invention is to control the internal impedance of a light module such that each light device within the light module has the same lighting capability.

Another object of the present invention is to provide a light keyboard having uniform lighting.

According to the objects mentioned above, the present invention provides a light module comprising a first power line, a second power line, and light devices. The first power line is connected to a first power point. The second power line is connected to a second power point. Each light device comprises a first terminal coupled to the first power line and a second terminal coupled to the second power line. A first sum of a first line length between the first power point and the first terminal of any of the light devices and a second line length between the second power point and the second terminal thereof is substantially a first constant.

Embodiments of the present invention also provide a light keyboard comprising a key portion and light devices. The key portion comprises a seat and at least one key. The seat comprises a first power line connected to a first power point and a second power line connected to a second power point. The key is disposed on the seat and moves upward and downward relative to the seat. Each light device comprises a first terminal coupled to the first power line and a second terminal coupled to the second power line. A first sum of a first line length between the first power point and the first terminal of any of the light devices and a second line length between the second power point and the second terminal thereof is a first constant.

BRIEF DESCRIPTION OF THE DRAWINGS

The present invention can be more fully understood by reading the subsequent detailed description and examples with reference made to the accompanying drawings, wherein.

DETAILED DESCRIPTION OF THE INVENTION

Figure 1:
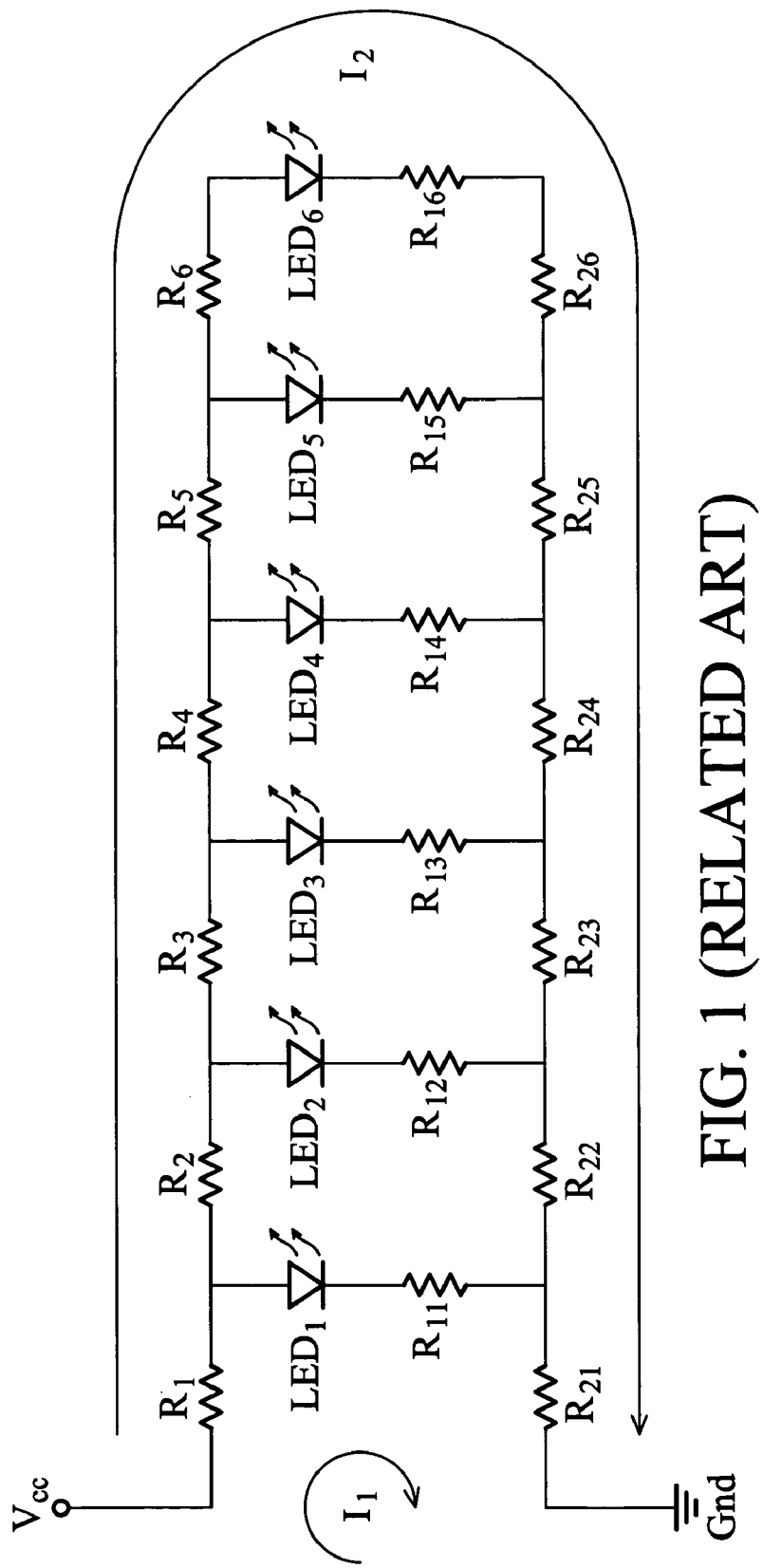
FIG. 1 is a circuit view of light emitting diodes of a conventional light keyboard.
Figure 2:
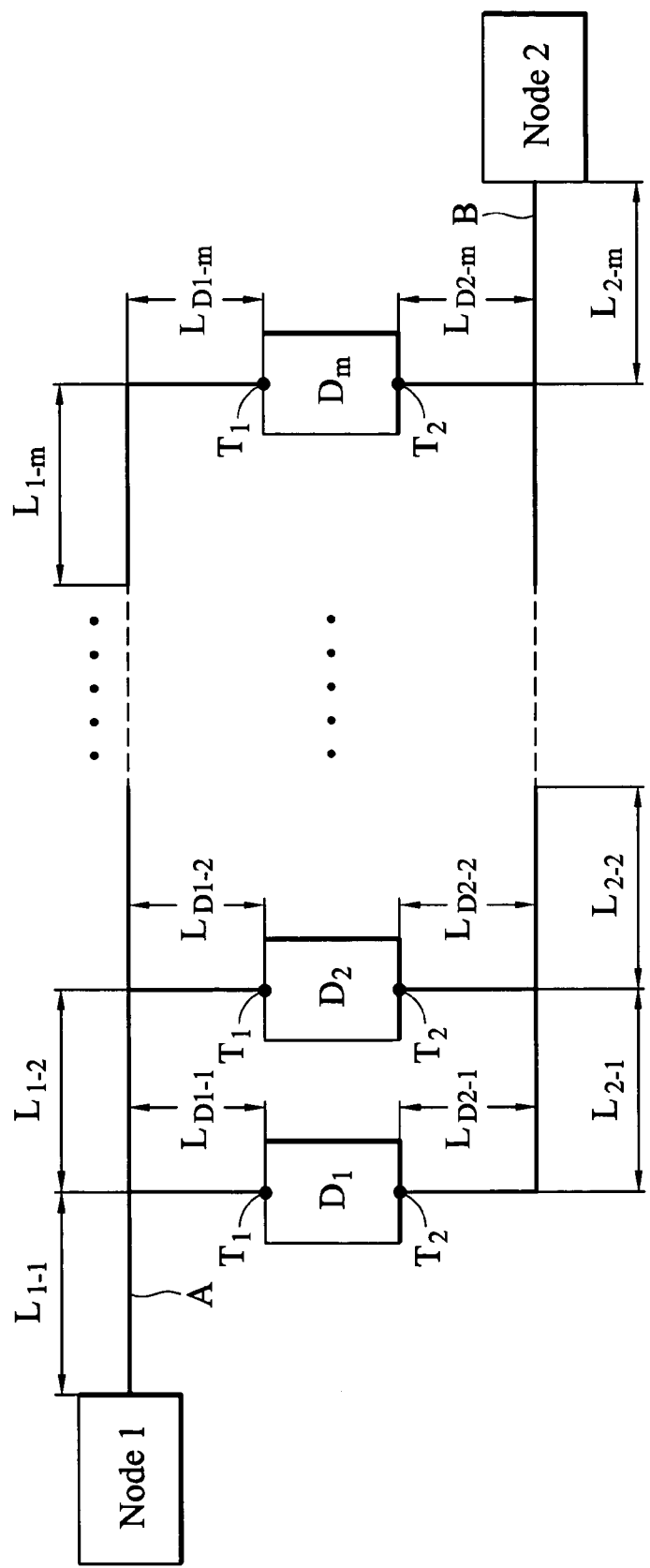
FIG. 2 is a schematic view of a light module as disclosed in an embodiment of the invention.

FIG. 2 is a schematic view of a light module as disclosed in an embodiment of the invention. First power line A is connected to a first power point Node1. Second power line B is connected to a second power point Node2. Each light device $D_1 \sim D_m$ comprises a first terminal $T_1$ coupled to the first power line A and a second terminal $T_2$ coupled to the second power line B.

The first power line A comprises line lengths $L_{1-1} \sim L_{1-m}$ and $L_{D1-1} \sim L_{D1-m}$. Line lengths $L_{1-1} \sim L_{1-m}$ are the same and line lengths $L_{D1-1} \sim L_{D1-m}$ are also the same. The second power line B comprises line lengths $L_{2-1} \sim L_{2-m}$ and $L_{D2-1} \sim L_{D2-m}$. Line lengths $L_{2-1} \sim L_{2-m}$ are the same and line lengths $L_{D2-1} \sim L_{D2-m}$ are also the same.

A first sum of a first line length between the first power point A and the first terminal $T_1$ of any of the light devices $D_1 \sim D_m$ and a second line length between the second power point B and the second terminal $T_2$ thereof is substantially a first constant.

For example, one sum of line lengths $L_{1-1}$ and $L_{D1-1}$ between the first power point Node 1 and the first terminal $T_1$ of the light devices $D_1$ and line lengths $L_{D2-1}$ and $L_{2-1} \sim L_{2-m}$ between the second power point Node 2 and the second terminal $T_2$ of the light devices $D_1$ is substantially a first constant. Another sum of line lengths $L_{1-1}$, $L_{1-2}$ and $L_{D2-1}$ between the first power point Node 1 and the first terminal $T_1$ of the light devices $D_2$ and line lengths $L_{D2-2}$ and $L_{2-2} \sim L_{2-m}$ between the second power point Node 2 and the second terminal $T_2$ of the light devices $D_2$ is also substantially the first constant. Therefore, line lengths $L_{1-1} \sim L_{1-m}$ and $L_{2-1} \sim L_{2-m}$ are the same, and line lengths $L_{D1-1} \sim L_{D1-m}$ and $L_{D2-1} \sim L_{D2-m}$ are the same.

Figure 3:
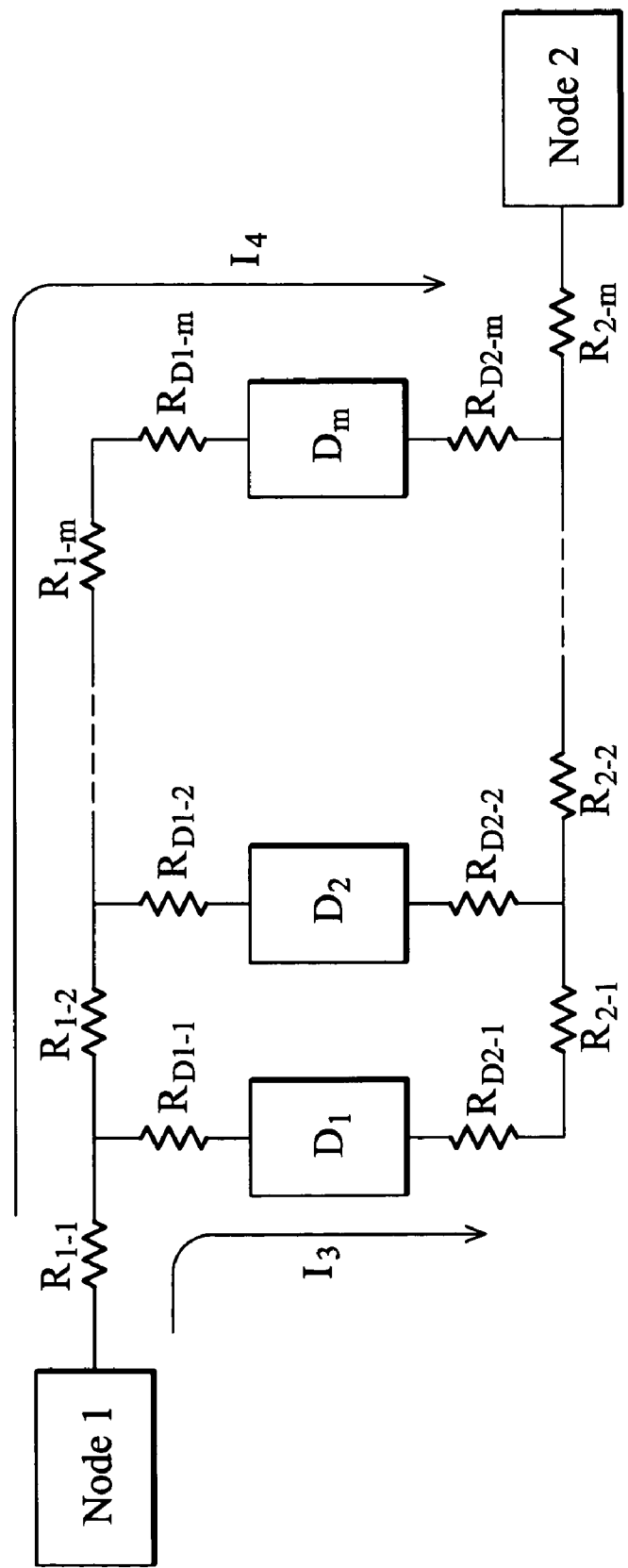
FIG. 3 is a circuit view of a light module as disclosed in an embodiment of the invention.

FIG. 3 is a circuit view of a light module as disclosed in an embodiment of the invention. The first power line A and second power line B comprise conductor resistors respectively. Impedance values of conductor resistors are decided by length of the first power line A and second power line B. If line length is longer, impedance value of conductor resistors is higher.

The first power line A comprises line lengths $L_{1-1} \sim L_{1-m}$ and $L_{D1-1} \sim L_{D1-m}$ such that resistors $R_{1-1} \sim R_{1-m}$ and $R_{D1-1} \sim R_{D1-m}$ represent the conductor resistors of line lengths $L_{1-1} \sim L_{1-m}$ and $L_{D1-1} \sim L_{D1-m}$ respectively. The first power line B comprises line lengths $L_{2-1} \sim L_{2-m}$, and $L_{D2-1} \sim L_{D2-m}$ such that resistors $R_{2-1} \sim R_{2-m}$ and $R_{D2-1} \sim R_{D2-m}$ represent the conductor resistors of line lengths $L_{2-1} \sim L_{2-m}$, and $L_{D2-1} \sim L_{D2-m}$ respectively. If impedance values of resistors $R_{1-1} \sim R_{1-m}$ and $R_{2-1} \sim R_{2-m}$ are the same, and that of resistors $R_{D1-1} \sim R_{D1-m}$ and $R_{D2-1} \sim R_{D2-m}$ are the same, the sum of first line length between the first power point Node1 and any light device and a second line length between the second power point Node2 and the light device is substantially a constant.

Suppose impedance values of resistors $R_{1-1} \sim R_{1-m}$ and $R_{2-1} \sim R_{2-m}$ equal 2R and resistors $R_{D1-1} \sim R_{D1-m}$ and $L_{D2-1} \sim$ $L_{D2\text{-}m}$ equal R. The impedance sum of current path $I_3$ from first power point Node1 to second power point Node2 via light device D1 is $$2R+R+R+2R\times m \quad (1)$$

Wherein m is sum of resistor $R_{D2\text{-}1}$~$R_{D2\text{-}m}$.

The impedance sum of current path $I_4$ from first power point Node1 to second power point Node2 via light device Dm is $$2R\times m+R+R+2R \quad (2)$$

Wherein m is sum of resistor $R_{D1\text{-}1}$~$R_{D1\text{-}m}$.

Comparing (1) with (2), impedance sums of current paths $I_3$ and $I_4$ are the same. Current flows on different current paths are the same such that lighting capabilities of different light devices are the same.

Figure 4:
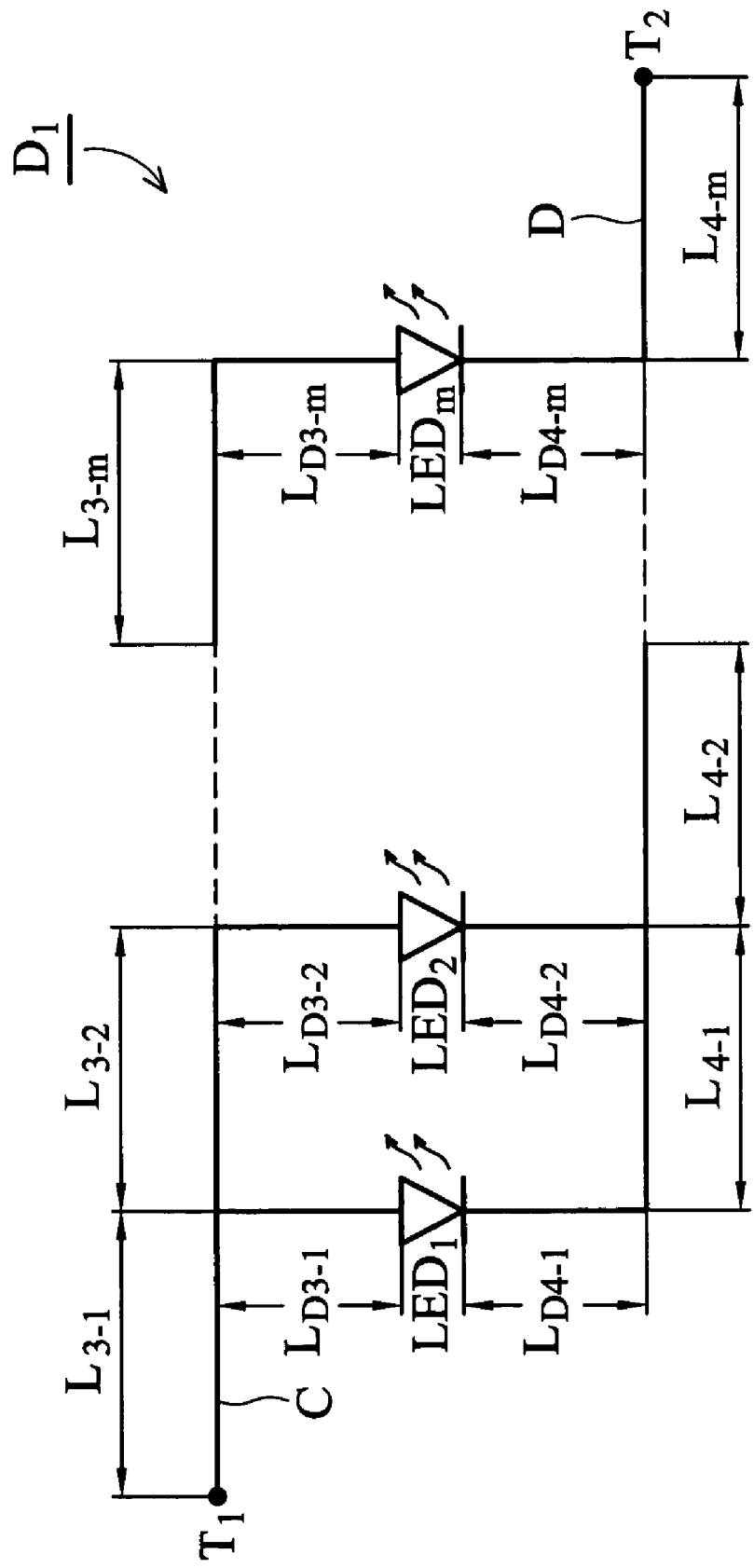
FIG. 4 is internal view of a light device of an embodiment of the present invention.

FIG. 4 is internal view of a light device of an embodiment of the present invention. Only light device $D_1$ is described herein as an example as light devices $D_1$~$D_m$ are the same. The light device $D_1$ comprises third power line C, fourth power line D, and light elements such as light emitting diodes $LED_1$~$LED_m$. The third power line C is connected to the first terminal $T_1$ of light device $D_1$. The fourth power line D is connected to the second terminal $T_2$ of light device $D_1$. Each light emitting diode $LED_1$~$LED_m$ comprises an anode coupled to the third power line C and a cathode coupled to the fourth power line D.

A second sum of a third line length between the first terminal $T_1$ and the anode of any of the light emitting diodes $LED_1$~$LED_m$ and a fourth line length between the second terminal $T_2$ and the cathode of the flight emitting diode is substantially a second constant.

Figure 5:
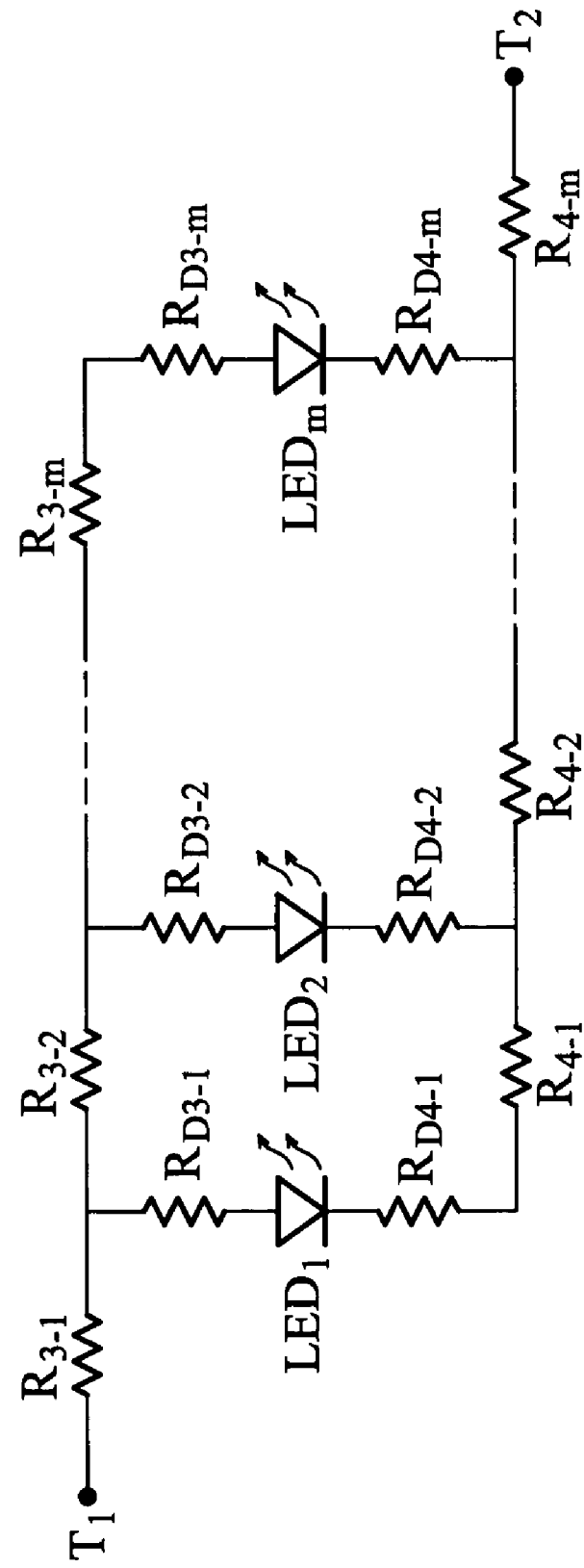
FIG. 5 is circuit view of the light device of an embodiment of the present invention.

FIG. 5 is circuit view of the light device of an embodiment of the present invention. Resistors $R_{3\text{-}1}$~$R_{3\text{-}m}$, and $R_{D3\text{-}1}$~$R_{D3\text{-}m}$ represent conductor resistors of third power line C. Resistors $R_{D4\text{-}1}$~$R_{D4\text{-}m}$, and $R_{4\text{-}1}$~$R_{4\text{-}m}$ represent conductor resistors of fourth power line D. Impedance values of conductor resistors are decided by length of the third power line C and fourth power line D. If line length is longer, impedance value of conductor resistors is higher.

If impedance values of resistors $R_{3\text{-}1}$~$R_{3\text{-}m}$ and $R_{4\text{-}1}$~$R_{4\text{-}m}$ are the same, and that of resistors $R_{D3\text{-}1}$~$R_{D3\text{-}m}$ and $R_{D4\text{-}1}$~$R_{D4\text{-}m}$ are the same, the sum of the third line length between the first terminal $T_1$ and any light emitting diode $LED_1$~$LED_m$ and a fourth line length between the second terminal $T_2$ and the light emitting diode is substantially a constant.

Figure 6:
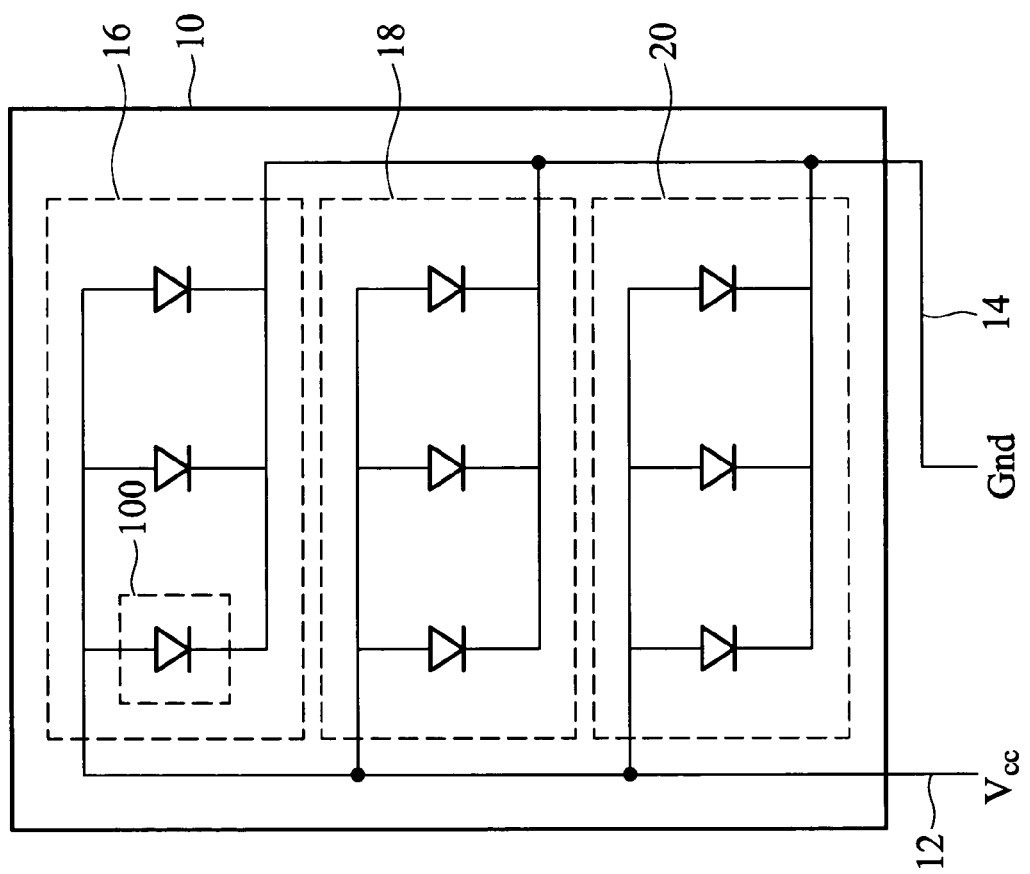
FIG. 6 is a schematic view of a light keyboard of an embodiment of the present invention.

A light keyboard comprises a seat and at least one key. The key is disposed on the seat and moves upward and downward relative to the seat. A light device is disposed under the key. FIG. 6 is a schematic view of a light keyboard of an embodiment of the present invention. In FIG. 6, the light keyboard is a 3×3 keyboard such that three light modules 16, 18, and 20 according to an embodiment of the present invention are provided. Each light module comprises three light emitting diodes. The seat 10 comprises a first power line 12 connected to a first power point $V_{CC}$ and a second power line 14 connected to a second power point Gnd. In one light module, the lengths of first power line 12 and second power line 14 between any two light emitting diodes are the same.

Each light emitting diode 100 is disposed between the corresponding key (not shown) and seat 10 such that the number of light emitting diodes 100 is equal to the number of keys. The anode of each light emitting diode 100 is connected to the first power line 12 and the cathode of each light emitting diode 100 is connected to the second power line 14. The lengths between all anodes and first power line 12 are the same. The lengths between all cathodes and second power line 14 are the same. The first power point $V_{CC}$ receives high voltage and the second power point Gnd receives low voltage.

Since lengths between each light module and the first power line 12 equal lengths between each light module and the second power line 14, currents through each light module are the same. Additionally, the lengths between all anodes and first power line 12 are the same and the lengths between all cathodes and second power line 14 are the same. The currents through each light emitting diode are the same such that lighting capabilities of all light emitting diodes are the same. Therefore, the light keyboard has uniform illumination.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A light module comprising:
    a first power line connected to a first power point;
    a second power line connected to a second power point; and
    a plurality of light devices each comprising a first terminal coupled to the first power line and a second terminal coupled to the second power line, wherein a first sum of a first line length between the first power point and the first terminal of any of the light devices and a second line length between the second power point and the second terminal of the corresponding light device thereof is substantially a first constant;
    wherein each light device comprises:
        a third power line connected to the first terminal of the corresponding light device;
        a fourth power line connected to the second terminal of the corresponding light device; and
        a plurality of light elements each comprising a third terminal coupled to the third power line and a fourth terminal coupled to the fourth power line, wherein a second sum of a third line length between the corresponding first terminal and the third terminal of any of the light elements and a fourth line length between the corresponding second terminal and the fourth terminal thereof is substantially a second constant.

2. The light module as claimed in claim 1, wherein the voltage level of the first power line and that of the third power line are high voltage level, and the voltage level of the second power line and that of the fourth power line are low level voltage.

3. The light module as claimed in claim 2, wherein the light devices are light emitting diodes each comprising an anode coupled to the first power line and a cathode coupled to the second power line.

4. The light module as claimed in claim 1, wherein the voltage level of the first power line is high voltage level and that of the second power line is low voltage level.

5. The light module as claimed in claim 4, wherein the light devices are light emitting diodes each comprising an anode coupled to the first power line and a cathode coupled to the second power line.

6. A light keyboard, comprising:
a key portion including a seat with a first power line connected to a first power point and a second power line connected to a second power point, and at least one key disposed on the seat moving upward and downward relative to the seat; and
a plurality of light devices each comprising a first terminal coupled to the first power line and a second terminal coupled to the second power line, wherein a first sum of a first line length between the first power point and the first terminal of any of the light devices and a second line length between the second power point and the second terminal of the corresponding light thereof is a first constant;
wherein each light device comprises:
   a third power line connected to the first terminal of the corresponding light device;
   a fourth power line connected to the second terminal of the corresponding light device; and
   a plurality of light elements each comprising a third terminal coupled to the third power line and a fourth terminal coupled to the fourth power line, wherein a second sum of a third line length between the corresponding first terminal and the third terminal of any of the light elements and a fourth line length between the corresponding second terminal and the fourth terminal thereof is substantially a second constant.

7. The light keyboard as claimed in claim 6, wherein the voltage level of the first power line is high voltage level and that of the second power line is low voltage level.

8. The light keyboard as claimed in claim 6, wherein the light devices are light emitting diodes each comprising an anode coupled to the first power line and a cathode coupled to the second power line.

9. The light keyboard as claimed in claim 6, wherein each light device is disposed under one key.

* * * * *